(12) United States Patent
Tomoe et al.

(10) Patent No.: US 6,697,177 B1
(45) Date of Patent: Feb. 24, 2004

(54) IMAGE FORMING APPARATUS

(75) Inventors: Tetsuro Tomoe, Osaka (JP); Yukihiro Itoh, Osaka (JP); Takashi Mihara, Osaka (JP); Tadahiro Kiyosumi, Osaka (JP); Susumu Hanano, Osaka (JP)

(73) Assignee: Kyocera Mita Corporation, Osaka (JP)

( * ) Notice: Subject to any disclaimer, the term of this patent is extended or adjusted under 35 U.S.C. 154(b) by 0 days.

(21) Appl. No.: 09/233,631

(22) Filed: Jan. 19, 1999

(30) Foreign Application Priority Data

Jan. 19, 1998 (JP) .......................................... 10-007961

(51) Int. Cl.$^7$ ................................................ H04N 1/04
(52) U.S. Cl. ..................... 358/498; 358/496; 399/364; 399/18; 399/21; 271/225; 355/324
(58) Field of Search ................................. 358/496, 498, 358/474, 497, 400, 401; 399/364, 18, 21; 271/225; 355/324

(56) References Cited

U.S. PATENT DOCUMENTS

| | | | | |
|---|---|---|---|---|
| 5,649,033 A | * | 7/1997 | Morikawa et al. | 382/297 |
| 5,719,540 A | * | 2/1998 | Takaoka | 355/35 |
| 5,933,251 A | * | 8/1999 | Yoshimoto | 358/496 |
| 6,088,135 A | * | 7/2000 | Kusumoto | 358/498 |

* cited by examiner

*Primary Examiner*—Kimberly Williams
*Assistant Examiner*—Negussie Worku
(74) *Attorney, Agent, or Firm*—Jordan and Hamburg LLP

(57) ABSTRACT

In an image forming apparatus which uses a hollow space between an image reading section provided in an upper part of the apparatus and an image forming section provided in a lower part of the apparatus as a paper output space, the hollow space is used also as a space for temporarily holding a sheet of paper during a switchback operation. This arrangement helps prevent physical contact between the paper and the body of an operator or other objects and makes it easier to deal with a paper jam which is likely to occur during the switchback operation.

10 Claims, 2 Drawing Sheets

IMAGE FORMING APPARATUS

BACKGROUND OF THE INVENTION AND RELATED ART STATEMENT

The present invention relates to an image forming apparatus, such as a copying machine or a facsimile machine, provided with an image reading section and a paper switchback mechanism which can reverse the paper feeding direction.

Generally, the construction of a conventional image forming apparatus having an image reading section like a copying machine or a facsimile machine is such that the image reading section is provided in an upper portion of a main body of the apparatus and an image forming section is located in a lower portion of the main body, in which each sheet of paper carrying an image formed in the image forming section is ejected onto an output tray provided on one side of the apparatus. Nowadays, most image forming apparatus employ digital technology, and this has made it possible to position their image reading section and image forming section independently of each other.

In an image forming apparatus proposed recently, a paper output space for receiving each sheet of paper which has gone through an image forming process is provided between an image reading section in an upper portion of a main body of the apparatus and an image forming section in a lower portion of the main body, unlike the conventional image forming apparatus whose output tray is provided on one side of the apparatus. An important advantage of this approach is that the overall size of the image forming apparatus is reduced, making it possible to place the apparatus even in a limited space available.

In another recently proposed image forming apparatus, an image reading section provided in an upper portion of a main body of the apparatus is located toward the rear of an image forming section which is provided in a lower portion of the main body and there is formed an opening in the front of the apparatus at a position higher than a paper output space which is provided between the image reading section and the image forming section. This approach is advantageous in that it is easier to visually check each sheet of paper ejected into the paper output space and take them out from the paper output space. If the image forming apparatus of this kind is required to have a double-sided image forming capability, there is provided a switchback path inside the apparatus. A sheet of paper is temporarily led into the switchback path to undergo a switchback operation, in which the paper feeding direction is reversed and the sheet is turned upside down.

If, however, such a switchback path is provided in the main body of the apparatus, a paper jam is likely occur while the paper is obliquely transferred during the switchback operation. Nevertheless, it has been difficult in prior art constructions to remove the paper which has jammed in the switchback path.

It might be possible to use a space available at the side of the main body of the apparatus for temporarily holding the paper during the switchback operation. A problem of this approach is that proper switchback operation is likely to be disturbed if the paper, which is temporarily ejected to the side of the apparatus during the switchback operation, goes into physical contact with the body of an operator or other objects around the main body of the apparatus.

SUMMARY OF THE INVENTION

It is an object of the invention to provide an image forming apparatus which solves the aforementioned problems of the prior art.

According to the invention, an image forming apparatus comprises an image forming unit, a paper ejector for ejecting a sheet of paper carrying an image formed by the image forming unit onto a top surface of the image forming unit, and an image reader located above the image forming unit with a hollow space of specific dimensions formed between the image forming unit and the image reader, the hollow space serves to hold the sheet ejected onto the top surface of the image forming unit, a front surface of the image reader is recessed rearward from a front surface of the image forming unit so that a part of the top surface of the image reader can be observed from above the image forming apparatus, and the paper ejector includes a switchback mechanism for performing a switchback operation in which the sheet is turned to an opposite feed direction and guided back into the image forming unit after the paper ejector has advanced the sheet transferred from the image forming unit until a portion of the sheet projects over the top surface of the image forming unit.

Since the hollow space provided between the image forming unit and the image reader is used for temporarily holding the sheet of paper during the switchback operation in this image forming apparatus, an operator can catch a forward portion of the sheet projecting into the hollow space between the image forming unit and the image reader from above the apparatus and easily pull out the sheet to remove a paper jam. The construction of this image forming apparatus helps prevent physical contact between the paper and the body of the operator or other objects outside the main body of the apparatus during the switchback operation.

These and other objects, features and advantages of the invention will become more apparent upon reading the following detailed description in conjunction with the accompanying drawings.

DETAILED DESCRIPTION OF THE PREFERRED EMBODIMENT OF THE INVENTION

Figure 1B:
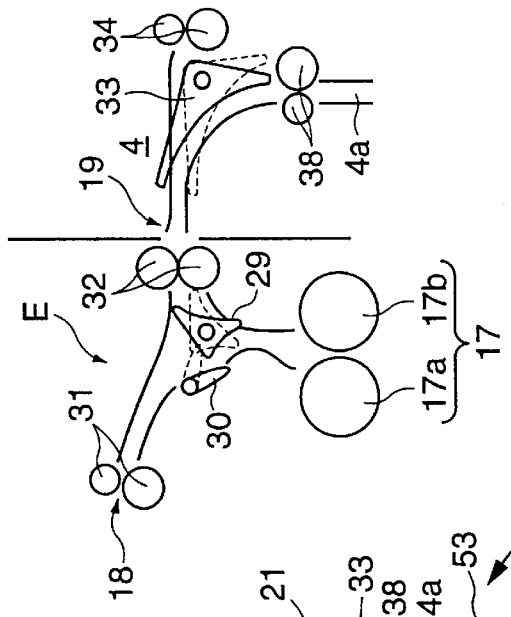
FIG. 1B is an enlarged view of a portion enclosed by a broken line in FIG. 1A.
Figure 1A:
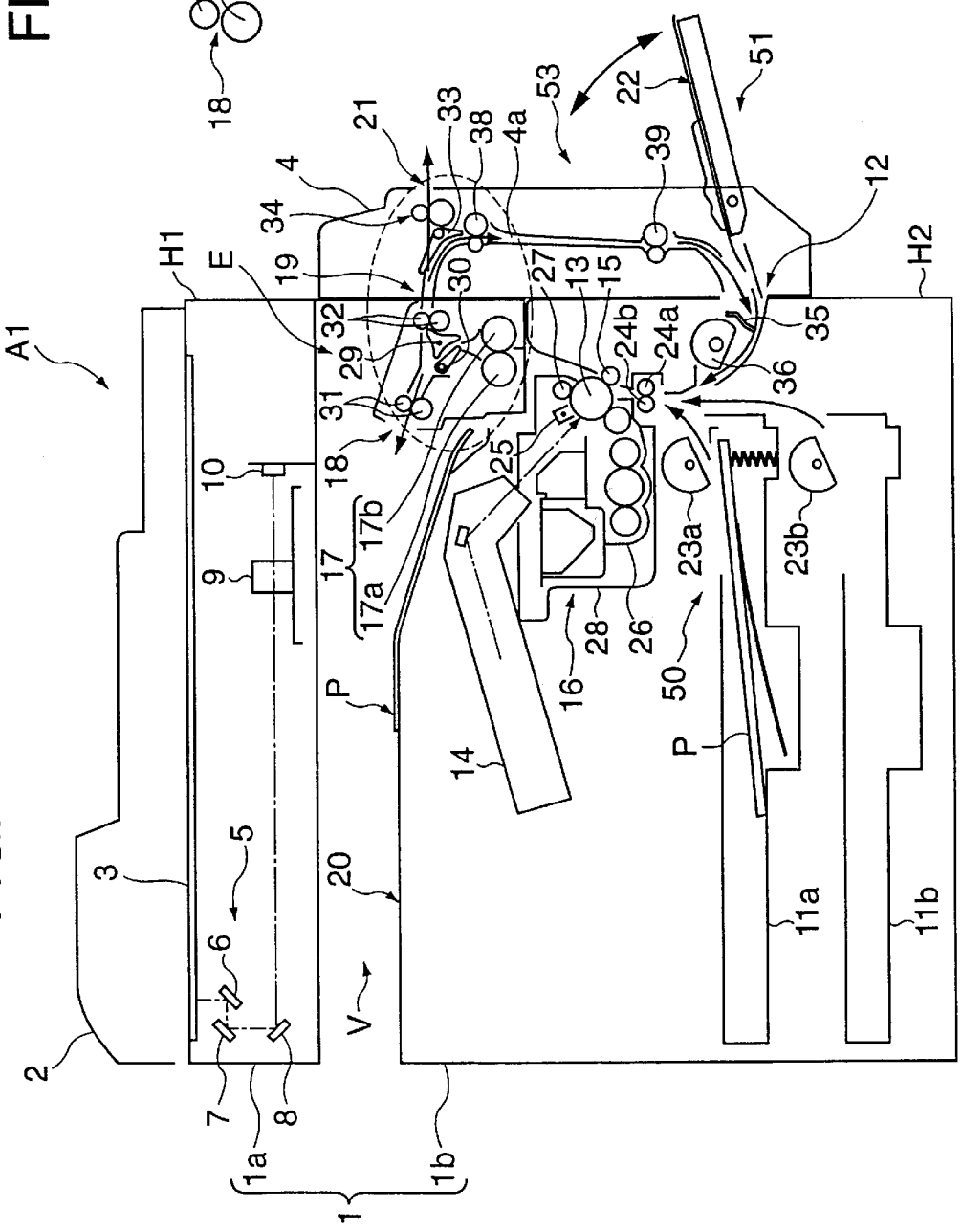
FIG. 1A is a general construction diagram of a copying machine according to an embodiment of the invention.

FIG. 1A is a general construction diagram of a copying machine A1 which is shown as an example of an image forming apparatus according to an embodiment of the invention.

A main body 1 of the copying machine A1 comprises an image reading section 1a which reads, or scans, an image of an original document and an image forming section 1b which forms a reproduced image on copying paper based on the original image scanned by the image reading section 1a. The image reading section 1a and the image forming section 1b are separately accommodated in an upper housing H1 and a lower housing H2, respectively. A reversible paper transport unit 4 forming part of the image forming section 1b is detachable mounted on one side surface of the lower housing H2.

Figure 2:
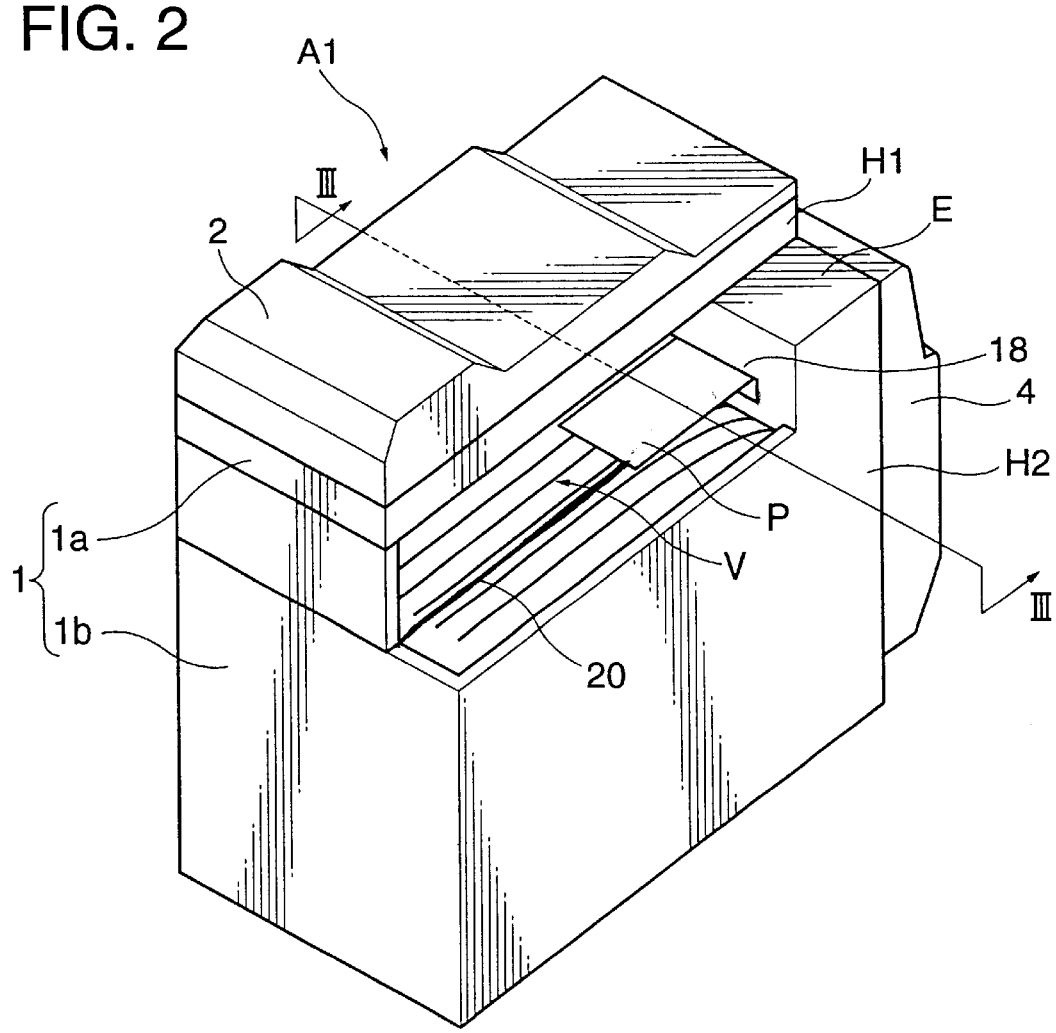
FIG. 2 is a perspective view of the copying machine showing a positional relationship between an upper housing accommodating an image reading section and a lower housing accommodating an image forming section.

FIG. 2 is a perspective view of the copying machine Al showing a positional relationship between the upper housing Hi and the lower housing H2.

As shown in FIG. 2, the upper housing H1 accommodating the image reading section 1a is located above the lower housing H2 accommodating the image forming section 1b with a hollow space V of specific dimensions provided between them. This hollow space V serves as a paper output space into which each sheet of paper P is ejected upon completion of an image transfer process, using a top surface of the lower housing H2 as a paper delivery table 20. In this construction, it is not necessary to provide a dedicated output tray for receiving the paper P on a side of the main body 1 and, thus, the copying machine A1 can be placed in a limited space available.

Furthermore, since a front surface of the upper housing H1 accommodating the image reading section 1a is recessed rearward from a front surface of the lower housing H2 in which the image forming section 1b is incorporated, an operator can easily see a front part of the paper delivery table 20 formed on the top surface of the lower housing H2 from above the copying machine A1. Therefore, the operator can visually observe the paper P ejected onto the paper delivery table 20 from above the copying machine A1 and remove the paper P whenever desired.

Figure 3:
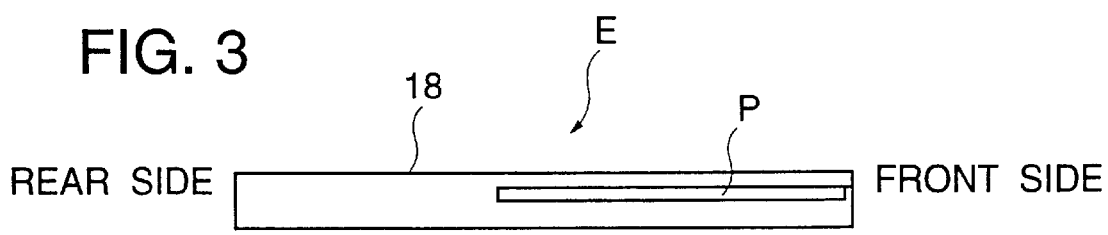
FIG. 3 is an explanatory diagram showing a paper ejecting position relative to a paper delivery port as viewed along sectional lines III—III of FIG. 2.

FIG. 3 is an explanatory diagram showing a paper ejecting position relative to a paper delivery port 18 as viewed along sectional lines III—III of FIG. 2.

As can be seen from FIG. 3, the paper P is ejected through a frontward portion of the paper delivery port 18 in this copying machine A1. It is therefore possible for the operator to visually observe the top side of the paper P ejected onto the paper delivery table 20 and easily remove it at any time. Specific means provided for ejecting the paper P through the frontward portion of the paper delivery port 18 will be described later in this Specification.

The image reading section 1a and the image forming section 1b incorporated in the copying machine A1 are now described with reference to FIG. 1A.

The image reading section 1a comprises an optical scanning system 5 for reading image information of an original document placed on an original glass plate 3 provided at the top of the upper housing H1 and a reversible automatic document feeder 2 mounted on top of the upper housing H1 for automatically feeding the original document onto the original glass plate 3.

The optical scanning system 5 includes a fluorescent lamp which is not unillustrated, mirrors 6, 7 and 8 for guiding light reflected from a side of the original document illuminated by the fluorescent lamp, a lens 9 and a line sensor 10 which receives the reflected light. As the original document is transferred over the original glass plate 3 by the reversible automatic document feeder 2, the optical scanning system 5 scans the document to acquire its image information. If the original document is a bound printed material like a book which is directly placed by the operator in a fixed position on the original glass plate 3, part of the optical scanning system 5, e.g., the mirror 6, is moved in a lateral direction (as illustrated in FIG. 1A) to scan across the whole area of the original to obtain its image information. The image forming section 1b comprises a paper feed cassette assembly 50 including paper cassettes 11a, 11b for holding paper stacks from which individual sheets of paper P are supplied, a manual feed assembly 51 for feeding each sheet of paper P loaded on a manual feed tray 22, an image forming assembly 16 which forms a toner image on the paper P, a fixer assembly 17 which fuses the toner image onto the paper P, a paper ejecting mechanism E which ejects the paper P into the paper output space upon completion of the image transfer process, and a paper return assembly 53 which transfers the paper P from the paper ejecting mechanism E to the manual feed assembly 51 when the paper P should undergo a double-sided image forming operation.

Individual elements of the image forming section 1b are now described in detail along a paper path through which the paper P to be subjected to the double-sided image forming operation is transported. A single-sided image forming operation will be briefly described later in this Specification.

The paper feed cassette assembly 50 includes the aforementioned paper cassettes 11a, 11b which are mounted inside the lower housing H2 and can be drawn out therefrom and feed rollers 23a, 23b having a semicircular shape in cross section and located above the paper cassettes 11a, 11b. Each of the feed rollers 23a, 23b is caused to rotate with precisely controlled timing to pull out and feed an uppermost sheet of paper P from the respective paper cassettes 11a, 11b. Each sheet of paper P fed from the paper cassette 11a or 11b is transferred toward the image forming assembly 16.

To make it possible to eject each sheet of paper P carrying a reproduced image through the frontward portion of the paper delivery port 18 as shown in FIG. 3, paper stacks are always aligned with the front sides of the paper cassettes 11a, 11b regardless of the paper size. With the paper stacks loaded in the paper cassettes 11a, 11b in this manner, each sheet of paper P is transferred along the front side of the paper path in the image forming section 1b as well.

The manual feed assembly 51 includes the aforementioned manual feed tray 22 which is mounted on one side of the reversible paper transport unit 4 and can be freely opened and closed, a manual feeding port 12 through which the paper P loaded on the manual feed tray 22 is fed into the lower housing H2 of the copying machine A1, a paper detecting switch 35 which senses whether the paper P has been inserted into the manual feeding port 12, and a feed roller 36 located on the inside of the manual feeding port 12. Like the feed rollers 23a, 23b, the feed roller 36 is caused to rotate with precisely controlled timing to pull out and feed an uppermost sheet of paper P from the manual feed tray 22. Each sheet of paper P fed from the manual feed tray 22 is transferred toward the image forming assembly 16.

A paper stack loaded on the manual feed tray 22 is aligned with its front side regardless of the paper size to ensure that each sheet of paper P fed from the manual feed assembly 51 is transferred along the front side of the paper path formed in the copying machine A1 in a manner similar to the foregoing description of the paper feed cassette assembly 50.

The manual feed assembly 51 is also used when forming images on both sides of the paper P. The double-sided image forming operation will be described later in further detail.

As a sheet of paper P is fed from the paper feed cassette assembly 50 or from the manual feed assembly 51, the leading edge of the sheet is gripped by a pair of registration rollers 24a, 24b. The sheet is then transferred to the image forming assembly 16 as the registration rollers 24a, 24b are rotated with properly controlled timing.

The image forming assembly 16 produces a toner image on each sheet of paper P using a xerographic process. The image forming assembly 16 has as its principal element a photosensitive drum 13 which is rotatably supported by a shaft and has photo conductivity. Other elements included in the image forming assembly 16 are a static charger 25, an exposure unit 14, a developing unit 26, an image transfer unit 15 and a cleaner 27 which are arranged in this order around the photosensitive drum 13 along its turning direction.

The static charger 25 has a corona wire to which a high voltage is applied. The corona wire supplies a static charge of a specific voltage to the surface of the photosensitive drum 13 through a corona discharge. The exposure unit 14 selectively attenuates the voltage on the surface of the photosensitive drum 13 to produce an electrostatic latent image on the photosensitive drum 13. The developing unit 26 forms a toner image on the surface of the photosensitive drum 13 by developing the electrostatic latent image with a powdered ink, or toner. The image transfer unit 15 transfers the toner image from the surface of the photosensitive drum 13 onto the paper P. The fixer assembly 17 removes the excess toner from the surface of the photosensitive drum 13 after the toner image has been transferred onto the paper P.

After the toner image has been formed on the paper P in the image forming assembly 16, the paper P is further advanced toward the fixer assembly 17.

The fixer assembly 17 includes a heating roller 17a and a pressure roller 17b which together grip the paper P with a specified pressure and heat the paper P to fuse the toner image onto the paper P.

The paper path branches out into two ways immediately above the fixer assembly 17 and there are provided guiding pawls 29, 30 at this branching point for switching the paper path. When forming images on both sides of the paper P, the guiding pawls 29, 30 are set in positions shown by solid lines in FIG. 1B so that the paper P is guided into a path directed toward the paper delivery port 18 from the branching point. A later description will deal with a case in which the guiding pawls 29, 30 are set in positions shown by broken lines in FIG. 1B.

There are provided a pair of output rollers 31 at the paper delivery port 18 for ejecting the paper P carrying a finished image onto the paper delivery table 20 provided above the image forming section 1b. The output rollers 31 are not simply paper output means for ejecting the paper P onto the paper delivery table 20 after the aforementioned image forming process, but also constitute a principal part of the paper ejecting mechanism E capable of performing a switchback operation, in which the feed direction of the paper P is reversed. When performing a double-sided image forming operation, a first toner image is formed on one side of the paper P in the above-described manner and the output rollers 31 which have once gripped the paper P are controlled to transfer the paper P back to an opposite direction. The switchback operation is carried out by the following procedure.

When the paper P has reached a position between the two output rollers 31, the output rollers 31 grip the paper P and advance it further toward the hollow space v until the paper P reaches a specific point. The output rollers 31 are caused to stop rotating while gripping a portion of the paper P close to its trailing edge. The guiding pawls 29, 30 are set in the positions shown by the broken lines in FIG. 1B in this condition to form a paper path extending from the paper delivery port 18 to the inside of the reversible paper transport unit 4 through a paper output port 19. The output rollers 31 are caused to rotate in a reverse direction to pull the paper P which has temporarily been held in the hollow space V back into the copying machine A1 from the paper delivery port 18. The paper P pulled back into the main body 1 of the copying machine A1 is then transferred by the output rollers 31 into the reversible paper transport unit 4 through the paper output port 19.

Since each sheet of paper P is transferred along the front side of the paper path in the image forming section 1b regardless of the paper size as previously described, the paper P emerges into the hollow space V from the frontward portion of the paper delivery port 18 in the switchback operation.

The reversible paper transport unit 4 includes a paper return path 4a extending from the paper output port 19 to the manual feed assembly 51 and two pairs of transfer rollers 38, 39 for advancing the paper P through the paper return path 4a. The paper P which has been fed from the paper output port 19 of the main body 1 into the reversible paper transport unit 4 is transferred by these transfer rollers 38, 39 down to the manual feed assembly 51 through the reversible paper transport unit 4.

The paper return path 4a branches out into two ways in its upper part to provide a path extending to a paper output port 21 and there is provided a guiding pawl 33 at this branching point for switching the paper path. During the double-sided image forming operation, the guiding pawl 33 is set in a position shown by solid lines in FIG. 1B so that the paper P is guided along the paper return path 4a. A later description will deal with a case in which the guiding pawl 33 is set in a position shown by broken lines in FIG. 1B.

The paper P delivered to the manual feed assembly 51 through the paper return path 4a is fed again by the feed roller 36 and the registration rollers 24a, 24b toward the image forming assembly 16 in the same way as the paper P is fed from the manual feed tray 22. Since the paper P transferred again to the image forming assembly 16 is now turned upside down compared to the position it was first fed to the image forming assembly 16. Thus, a second toner image is formed on a reverse side of the paper P when it goes through the image forming assembly 16 a second time.

The paper P is transferred again to the fixer assembly 17 and the toner image is fused onto the reverse side of the paper P. Then, the paper P guided by the guiding pawls 29, 30 and advanced by the output rollers 31 is delivered onto the paper delivery table 20.

As so far described, the copying machine A1 utilizes the hollow space V formed between the upper housing H1 and the lower housing H2 for temporarily holding the paper P during the switchback operation. This arrangement ensures that the paper P does not go into physical contact with the body of the operator or other nearby objects during the switchback operation.

Furthermore, the operator can easily pull and remove the paper P from the topside of the copying machine A1 whenever a paper jam occurs during the switchback operation, because the front surface of the upper housing H1 is recessed rearward from the front surface of the lower housing H2 and there is no covering at an upper-front part of the hollow space V, allowing free operator access to the paper delivery table 20. It is also easy for the operator to check whether the copying machine A1 is properly performing the switchback operation by observing the copying machine A1 from its topside.

Moreover, since the paper P emerges from the frontward portion of the paper delivery port 18 in the switchback operation as shown in FIG. 3 regardless of the paper size, the operator can easily observe the paper P with his or her own eyes during the switchback operation and deal with a paper jam whenever it becomes necessary.

While the double-sided image forming operation performed by the copying machine A1 has thus far been described, it is also possible for the copying machine A1 to form a single image on one side of the paper P only. When performing a single-sided image forming operation, the copying machine A1 works as follows. A sheet of paper P fed from the paper feed cassette assembly 50 or from the manual feed assembly 51 is transferred through the image forming assembly 16 and the fixer assembly 17 to form an image on one side of the paper P and is guided to the paper delivery port 18 by the guiding pawls 29, 30 set in the positions shown by the solid lines in FIG. 1B. The paper P is then delivered onto the paper delivery table 20 without being pulled back into the main body 1 of the copying machine A1 for performing the double-sided image forming operation. The paper P ejected in this manner is positioned face down on the paper delivery table 20 with a printed side of the paper P facing downward.

It is also possible to copy multiple images on one side of the paper P. This is achieved by guiding the paper P which has once gone through the image forming process by the guiding pawls 29, 30 set in the positions shown by the broken lines in FIG. 1B and the guiding pawl 33 set in the position shown by the solid lines in FIG. 1B. The paper P thus guided is brought again into the image forming assembly 16 through the paper return path 4a without going through the switchback operation in the paper ejecting mechanism E.

Furthermore, if an unillustrated output tray is provided to the side of the paper output port 21 formed in the reversible paper transport unit 4 and the guiding pawl 33 is set in the position shown by the broken lines in FIG. 1B, it is possible to eject the paper P, which has been discharged from the paper output port 19 formed in the main body 1 of the copying machine A1 into the reversible paper transport unit 4, onto the unillustrated output tray by means of a pair of output rollers 34. In this case, the paper P carrying a single image formed on one side is ejected face up with a printed side of the paper P facing upward. Since the reversible paper transport unit 4 is detachable mounted in this embodiment, the reversible paper transport unit 4 may be removed from the copying machine A1 to make it more compact when neither the double-sided image forming operation nor multiple image forming on one side of the paper P is necessary. Even when the reversible paper transport unit 4 is removed, it is possible to manually feed the paper P if an appropriate manual feed tray is fitted directly to the manual feeding port 12 of the main body 1 of the copying machine A1. It is also possible to eject the paper P face up if an appropriate output tray is fitted directly to the paper output port 19 of the main body 1 of the copying machine A1.

While the invention has thus far been described with reference to the copying machine A1 according to one preferred embodiment, it should be appreciated that the invention is applicable to various types of image forming apparatus, such as facsimile machines and printers, provided that there is formed a paper output space between an image reading section and an image reading section.

Although the switchback operation is performed to turn the paper P upside down to make it possible to form images on both sides of the paper P in the foregoing embodiment, the switchback operation is also useful for ejecting the paper P face up or face down, or for various other purposes.

Furthermore, while the aforementioned embodiment employs the reversible paper transport unit 4 which is not designed to accommodate a paper stack in performing either the double-sided image forming operation or the multiple image forming operation, the invention is applicable to a copying machine or other types of image forming apparatus in which successive sheets of paper are once stacked on an intermediate tray after a first copying process and fed from the intermediate tray when a second copying process is performed.

While the invention has been fully described in detail with respect to the preferred embodiments thereof, it will be understood by those skilled in the art that the foregoing and other changes in form and details may be made therein without departing from the spirit and scope of the invention, which should be limited only by the scope of the appended claims.

What is claimed is:

1. An image forming apparatus, comprising:
    an image forming unit;
    a paper ejector for ejecting a sheet of paper carrying an image formed by the image forming unit onto a top surface of the image forming unit; and
    an image reader located above the image forming unit with a hollow space of specific dimensions formed between the image forming unit and the image reader, the hollow space serving to hold the sheet ejected onto the top surface of the image forming unit, a front surface of the image reader being recessed rearward from a front surface of the image forming unit so that a part of the top surface of the image forming unit can be observed from above the image forming apparatus, and
    the paper ejector including a switchback mechanism for performing a switchback operation by temporarily feeding a portion of the sheet out of the image forming unit in a feed direction so that the portion of the sheet is exposed in the hollow space to an exterior of the image forming apparatus, and then retracting the sheet back into the image forming unit in an opposite direction to said feed direction.

2. The image forming apparatus according to claim 1, wherein the paper ejector is constructed such that the sheet comes out from a frontward position of the paper ejector in the switchback operation.

3. The image forming apparatus according to claim 1, further comprising a paper return device which feeds the sheet into a paper path provided upstream of an image transfer portion of the image forming unit when the sheet is retracted back into the image forming unit.

4. The image forming apparatus according to claim 3, wherein the paper return device is detachable fitted to a main body of the apparatus.

5. An image forming apparatus, comprising:
    an image forming unit;
    a paper ejector for ejecting a sheet carrying an image formed by the image forming unit on a top side of the image forming unit, the paper ejector including a switchback unit for performing a switchback operation by temporarily feeding a portion of the sheet out of the image forming unit in a feed direction, and then retracting the sheet back into the image forming unit in an opposite direction to said feed direction; and
    an image reader disposed above the image forming unit with a space there between, the space accommodating the sheet ejected onto a top surface of the image forming unit from the image forming unit, a front surface of the image reader being recessed rearward from the front surface of the image forming unit so that a part of the top surface of the image forming unit is opened to an upward direction, wherein when the portion of the sheet is temporarily fed out of the image forming unit, the portion of the sheet is exposed in the space to an exterior of the image forming apparatus.

6. The image forming apparatus according to claim 5, wherein the paper ejector includes a paper delivery port in the form of an elongated slit extending horizontally from a front to a rear side of the apparatus, the recessed amount of the image reader being such that at least a front part of the slit is viewable by an operator from a top side of the apparatus.

7. An image reproducing apparatus, comprising:

an image forming unit;

an image reader disposed above the image forming unit in a manner defining a space between the image forming unit and the image reader, said space including an opening to an exterior of the image forming apparatus; and a paper ejector for ejecting a sheet of paper on which a reproduced image has been formed by the image forming unit, the paper ejector including a switchback mechanism for performing a switchback operation wherein a portion of the sheet is fed out of the image forming unit in a feed direction so that the portion of the sheet is temporarily received in the space, and then retracted back into the image forming unit in an opposite direction to said feed direction, said portion of the sheet of paper being accessible by a user while received in the space via said opening.

8. An image reproducing apparatus according to claim 7, wherein a front surface of the image reader is recessed rearwardly from a front surface of the image forming unit so that a part of the top surface of the image forming unit can be observed from above the image forming apparatus.

9. An image reproducing apparatus, comprising:

an upper housing containing an image reader for capturing an image to be reproduced;

a lower housing containing an image forming unit for reproducing the image; and a paper ejector for ejecting a sheet of paper on which a reproduced image has been formed by the image forming unit, said upper housing being disposed above the lower housing in a manner defining a space between a top surface of the lower housing and the upper housing in which the sheet of paper can be accommodated when ejected by the paper ejector, said space having an opening to an exterior of the image reproducing apparatus to permit access by a user to said sheet of paper via said opening when said sheet of paper is received in said space, said paper ejector including a switchback mechanism for performing a switchback operation wherein a portion of the sheet is fed out of the image forming unit in a feed direction so that the portion of the sheet is temporarily received in the space, and then retracted back into the image forming unit in an opposite direction to said feed direction.

10. An image reproducing apparatus according to claim 9, wherein a front surface of the upper housing is recessed rearwardly from a front surface of lower housing such that a part of the top surface on which at least a side portion of the sheet of paper rests when the portion of the sheet is temporarily received in the space is viewable by the user from above the upper housing.

\* \* \* \* \*